(12) United States Patent
Laimböck

(10) Patent No.: US 6,547,023 B2
(45) Date of Patent: Apr. 15, 2003

(54) SINGLE-TRACK MOTOR VEHICLE (75) Inventor: Franz Laimböck, Thal (AT)

(73) Assignee: AVL List GmbH, Graz (AU)

( * ) Notice: Subject to any disclaimer, the term of this patent is extended or adjusted under 35 U.S.C. 154(b) by 0 days.

(21) Appl. No.: 09/884,918

(22) Filed: Jun. 21, 2001

(65) Prior Publication Data
US 2002/0000340 A1 Jan. 3, 2002

(30) Foreign Application Priority Data
Jun. 28, 2000 (AT) .......................................... 477/2000 U (51) Int. Cl.$^7$ .............................................. B62D 61/02
(52) U.S. Cl. ........................ 180/227; 180/231; 180/292
(58) Field of Search ............................... 180/219, 228, 180/226, 227, 230, 231, 291, 292, 295, 9.64

(56) References Cited

U.S. PATENT DOCUMENTS

| 3,160,148 | A | | 12/1964 | Giacosa et al. | |
|---|---|---|---|---|---|
| 4,388,979 | A | * | 6/1983 | Fritzenwenger | 180/226 |
| 4,412,515 | A | | 11/1983 | Fritzenwenger | |
| 4,915,070 | A | * | 4/1990 | Okui | 123/196 R |
| 6,109,383 | A | * | 8/2000 | Matsuto et al. | 180/220 |
| 6,167,700 | B1 | * | 1/2001 | Lampert | 60/307 |
| 6,189,637 | B1 | * | 2/2001 | Tosaka et al. | 180/219 |
| 6,257,178 | B1 | * | 7/2001 | Laimbock | 123/54.1 |
| 6,357,545 | B1 | * | 3/2002 | Hori et al. | 180/219 |

FOREIGN PATENT DOCUMENTS

| DE | 3601273 | 7/1986 |
|---|---|---|
| JP | 62189330 | 8/1987 |

* cited by examiner

Primary Examiner—Avraham Lerner
(74) Attorney, Agent, or Firm—Dykema Gossett PLLC (57) ABSTRACT

A single-track motor vehicle with an internal combustion engine having at least one cylinder which is arranged in an inclined manner approximately horizontally relative to the driving direction, with at least one intake valve being arranged above at least one exhaust valve. In order to achieve the most compact possible design, the exhaust valve is triggered by way of a rocker lever.

12 Claims, 7 Drawing Sheets

SINGLE-TRACK MOTOR VEHICLE

BACKGROUND OF THE INVENTION

The invention relates to a single-track motor vehicle with an internal combustion engine with at least one cylinder which is arranged in an inclined manner approximately horizontally against the driving direction, with at least one intake valve being arranged above at least one exhaust valve. Single-track vehicles within the terms of the invention are motorcycles or snowmobiles with a drive track through which the propulsion force is transmitted.

It is common practice in motorcycles whose engine comprises a crankshaft which is disposed transversally to the driving direction to dispose the cylinder(s) in an upright manner or in a forwardly inclined manner as seen in the driving direction. Generally, the gear is disposed in this case behind the engine and in front of the rear wheel, thus allowing the representation of a favourable power transmission. In motorcycles which are equipped with a low step-through in the form of a motor scooter, there are problems which are difficult to solve in such a design, particularly when engines of higher piston capacity are provided. In particular, an infinitely-variable change-speed gear, which is known as a so-called Variomatic, poses particular packaging problems.

Similarly, in snowmobiles with more powerful engines there are problems housing the engine and the gear in the space below the front bonnet.

SUMMARY OF PRIOR ART

A cross-country motorcycle is known from DE 36 01 273 A which is provided with a cylinder which is arranged rearwardly in a substantially horizontal manner. This arrangement is used in the known solution to achieve the longest possible rear suspension swing arm, thus improving the performance. In the illustrated cross-country motorcycles, an additional load on the front wheel by an engine disposed forwardly as far as possible is advantageous.

SUMMARY OF THE INVENTION

It is the object of the present invention to house the drive unit of a single-track motor vehicle in a particularly compact and space-efficient manner. In contrast to the aforementioned state of the art, it is intended to provide an engine in a motorcycle which is designed in a particularly short way so as to limit the foot space as little as possible and to achieve the shortest possible wheel base. Similarly, the most compact possible arrangement of the drive unit and a low center of gravity are to be achieved in a similar way in a snowmobile.

This is achieved in accordance with the invention in such a way that the exhaust valve is triggered by a rocker lever. In connection with the cylinder which is arranged in a rearwardly horizontal manner this allows a particularly advantageous intake arrangement in a motorcycle, and in particular, a shifting of the cylinder head close to the rear wheel. The triggering of the exhaust valve(s) via the rocker lever further allows reduction in the overall height of the cylinder head in the zone of the closest approach to the rear wheel. In an analogous manner, it is thus possible to achieve a highly compact engine arrangement in a snowmobile, with the cylinder head of the internal combustion engine coming to lie directly before the drive track.

It is particularly advantageous in this connection when the intake valve is triggered directly by an overhead camshaft. Due to the higher arrangement of the intake valve it is possible to provide an overhead camshaft without any conflict with the rear wheel.

A particularly favourable intake arrangement is achieved when the valves are inclined in a V-shaped manner with respect to one another and when an intake port is guided between the valves to the cylinder. This concerns a so-called reverse tumble arrangement in which a swirl is provided in the combustion chamber whose axis is substantially perpendicular to the cylinder axis.

In a particularly favourable embodiment of the invention an infinitely-variable change-speed gear is provided with a first gear shaft which is in connection with the crankshaft, and with a second gear shaft which is held in the cylinder block of the internal combustion engine. A particularly compact arrangement can be achieved with the arrangement of the drive system in accordance with the invention. It is particularly advantageous in this connection when a centrifugal clutch is held on the second gear shaft. Generally, the centrifugal clutch will be provided on the opposite side of the gear. The infinitely-variable change-speed gear can be arranged as a dry-running pulling strap drive or with a thrust link chain which runs dry or in an oil bath.

An increase in the driving convenience can be achieved in such a way that at least one mass balancing shaft is integrated in the housing of the internal combustion engine.

A particularly compact arrangement of the motorcycle can be achieved when the internal combustion engine is a two-stroke engine with four valves per cylinder.

The production of the internal combustion engine can be simplified substantially when a crankshaft axis, an axis of a differential gear shaft and an axis of the gear shaft are disposed in a common plane of division of the internal combustion engine.

In the arrangement of the invention as a scooter, it is advantageous when the internal combustion engine is a part of the rear suspension swing arm. This means that the rear wheel is held in a drive set swing arm.

The invention will now be explained in greater detail by reference to the embodiments shown in the drawings.

DETAILED DESCRIPTION OF THE PREFERRED EMBODIMENT

Figure 1:
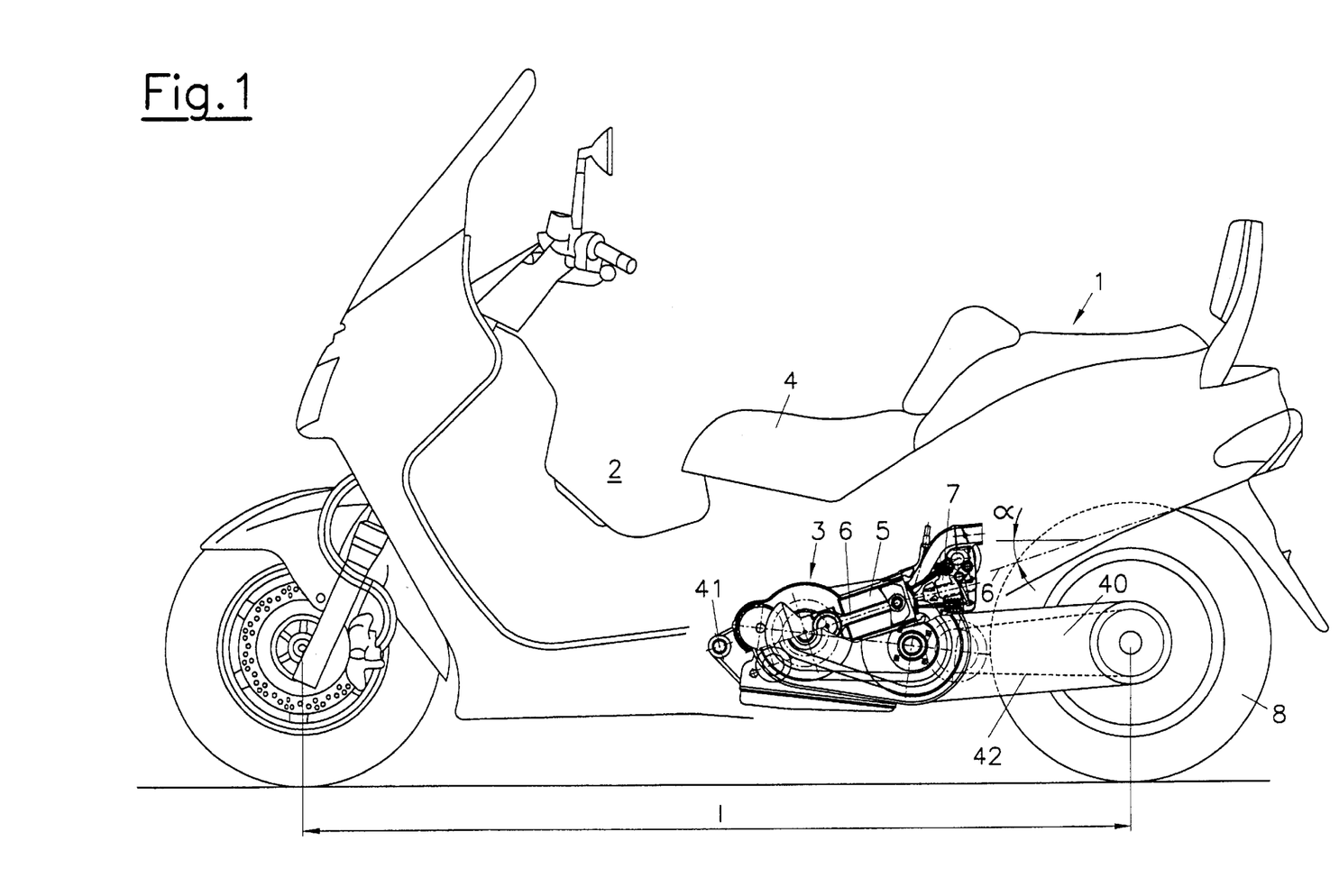
FIG. 1 shows a side view of a motorcycle in accordance with the invention.

In the motorcycle of FIG. 1 only the details relevant for the invention are designated and explained below.

The motorcycle comprises an arrangement in the form of a motor scooter, which means a relatively low step-through 2 is provided. The internal combustion engine 3 of the scooter 1 is arranged below the seat 4 for the rider who is not shown in detail. The engine concerns a two-cylinder four-stroke internal combustion engine with four valves per cylinder. The cylinders 5 of the internal combustion engine 3 are arranged rearwardly horizontally, with the cylinder axes 6 enclosing an angle α of approx. 12° to the horizontal. In order to achieve the shortest possible wheel base I and to limit the step-through as little as possible, the cylinder head 7 of the internal combustion engine 3 is moved as far as possible towards the rear wheel 8 of the motorcycle 1.

The internal combustion engine 3 is connected in the embodiment of FIG. 1 rigidly with the rear suspension swing arm 40 which is swivellably held about an axis 41 directly in front of the internal combustion engine 3. Power transmission to the rear wheel is performed via a toothed belt or a chain 42.

Figure 2:
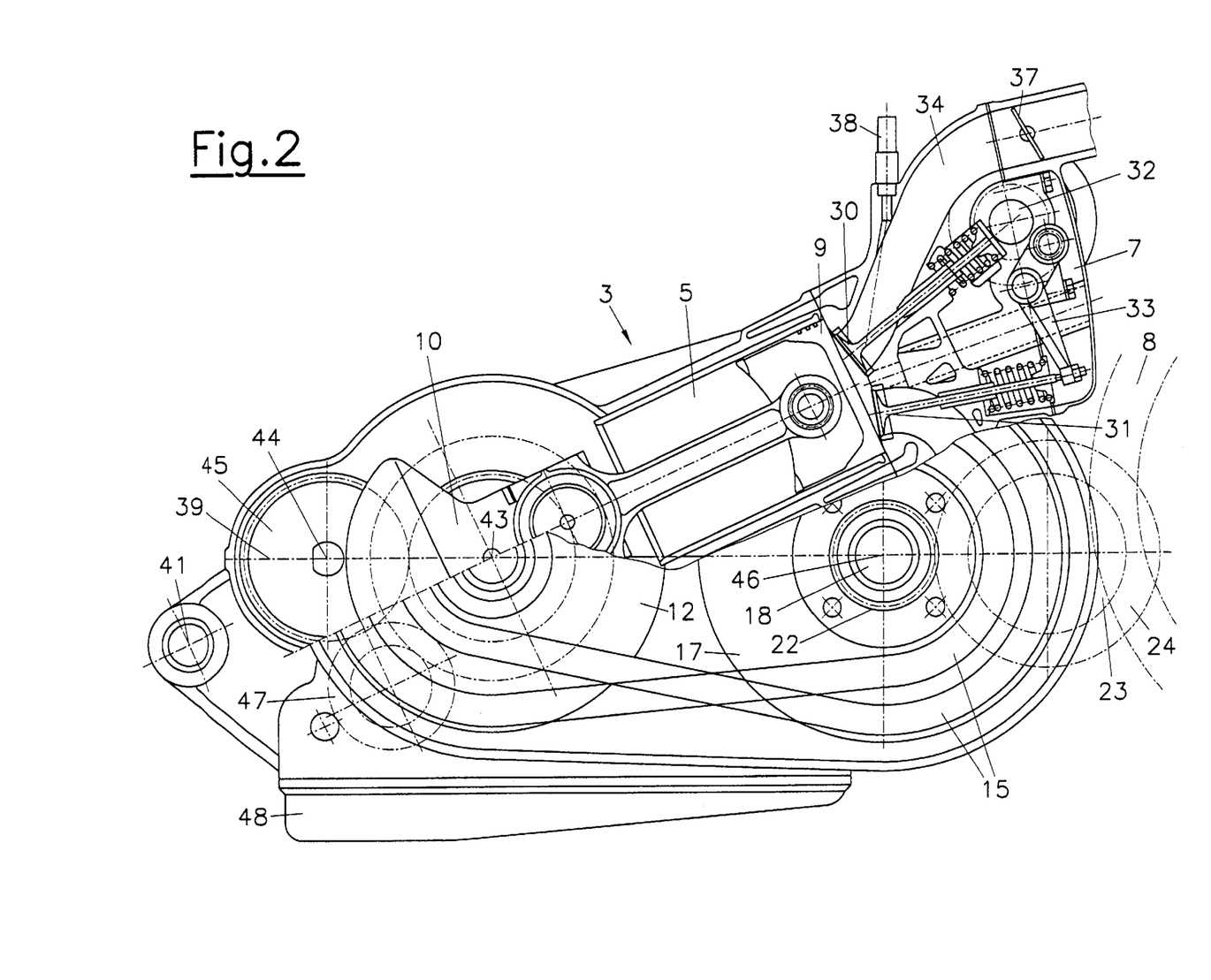
FIG. 2 shows a detail of FIG. 1.

FIG. 2 shows the internal combustion engine 3 of the motorcycle of FIG. 1 in a detailed view. The crankshaft axis 43, the axis 44 of a balancer shaft 45 for the first-order mass balancing which rotates in reverse motion to the crankshaft 10, and the axis 46 of the gear shaft 18 are disposed in a horizontal plane of division 39 of the internal combustion engine 3. A pulling strap 15 is wrapped around a pulley 12 and a second pulley 17. FIG. 2 shows with the unbroken lines a position of the pulling strap 15 at low speed and high ratio of transmission which corresponds to the first gear of a change speed gear. The broken lines show the position of the pulling strap 15 which corresponds to a high gear. FIG. 2 further shows an electric starter 47 and an oilpan 48 which is screwed on from below. The driving torque is transmitted by a driving pinion 22 fastened to the gear shaft 18 on to a toothed wheel 23 which is rigidly connected to a chain wheel 24 which drives the chain 42.

FIG. 2 shows that the intake valves 30 are actuated directly by an overhead camshaft 32. The exhaust valves 31 are actuated by way of rocker levers 33 which are in operative connection with the camshaft 32. This allows providing the cylinder head 7 in the zone of the rear wheel 8 with a low arrangement, so that a short overall length is achieved. The intake port 34 is guided in this embodiment from above to the intake valves and receives a throttle valve 37 and an injection nozzle 38.

Figure 3:
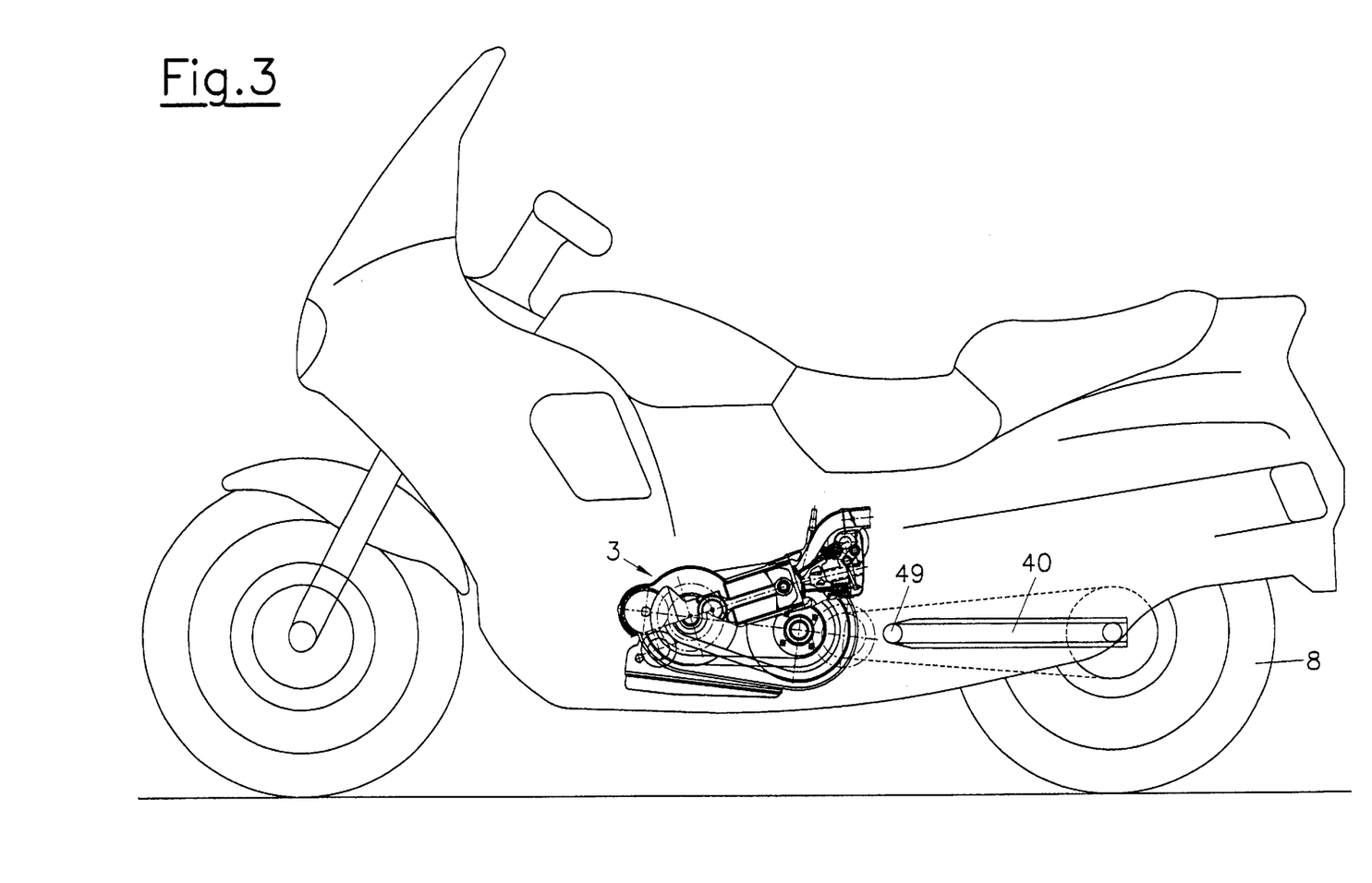
FIG. 3 shows a motorcycle according to a further embodiment of the invention.

FIG. 3 shows an embodiment of the invention which differs from the aforementioned variant in such a way that the internal combustion engine 3 is fixedly held in the motorcycle and the rear suspension swing arm 40 is swivellable about an axis disposed behind the internal combustion engine 3. The motorcycle per se is arranged as a conventional fully encased motorcycle.

Figure 4:
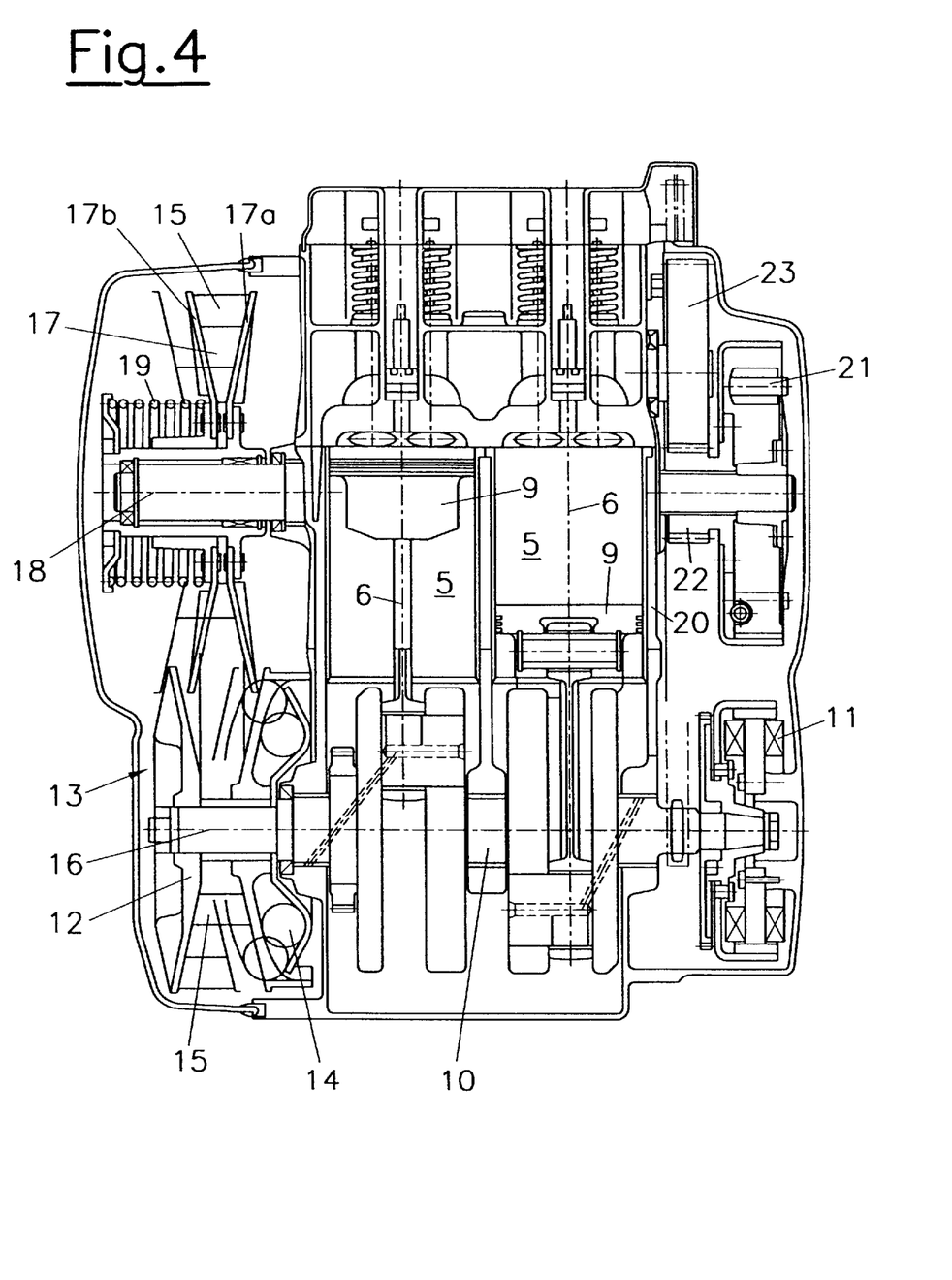
FIG. 4 shows a sectional view of an internal combustion engine of the motorcycle of FIG. 1 in an enlarged scale.

FIG. 4 shows the detailed arrangement of the internal combustion engine 3. Pistons 9 are movably arranged in two adjacently arranged cylinders 5 with parallel axes 6. With the crankshaft 10 of the internal combustion engine there are arranged on the one side the starter and the electric generator 11 and on the other side a pulley 12 for an infinitely-variable change-speed gear 13. A centrifugal timer 14 is arranged to displace an axially movable pulley half 12a with increasing speed in the direction towards an axially fixed pulley half 12b, so that the roll-off diameter of a pulling strap 15 increases. The pulley 12 is held on a first gear shaft 16 which is formed integrally with the crankshaft 10.

The pulling strap 15 drives a second pulley 17 which is held on a second gear shaft 18. The pulley consists of an axially fixed pulley half 17a, against which an axially movable pulley half 17b is pressed. The pressing force is produced by a coil spring 19. The second gear shaft 18 is held in the cylinder block 20 of the internal combustion engine 3 and extends from the pulley 17 directly adjacent to the cylinders 5, 6 to the opposite side of the internal combustion engine 3. The torque of the gear shaft 18 is transmitted by a centrifugal clutch 21 onto a driving pinion 22 which is in connection with a toothed wheel 23. A chain wheel 24 is provided coaxially to the toothed wheel 23 and rigidly connected with the same in order to transmit the propulsion onto the rear wheel 8.

Figure 5:
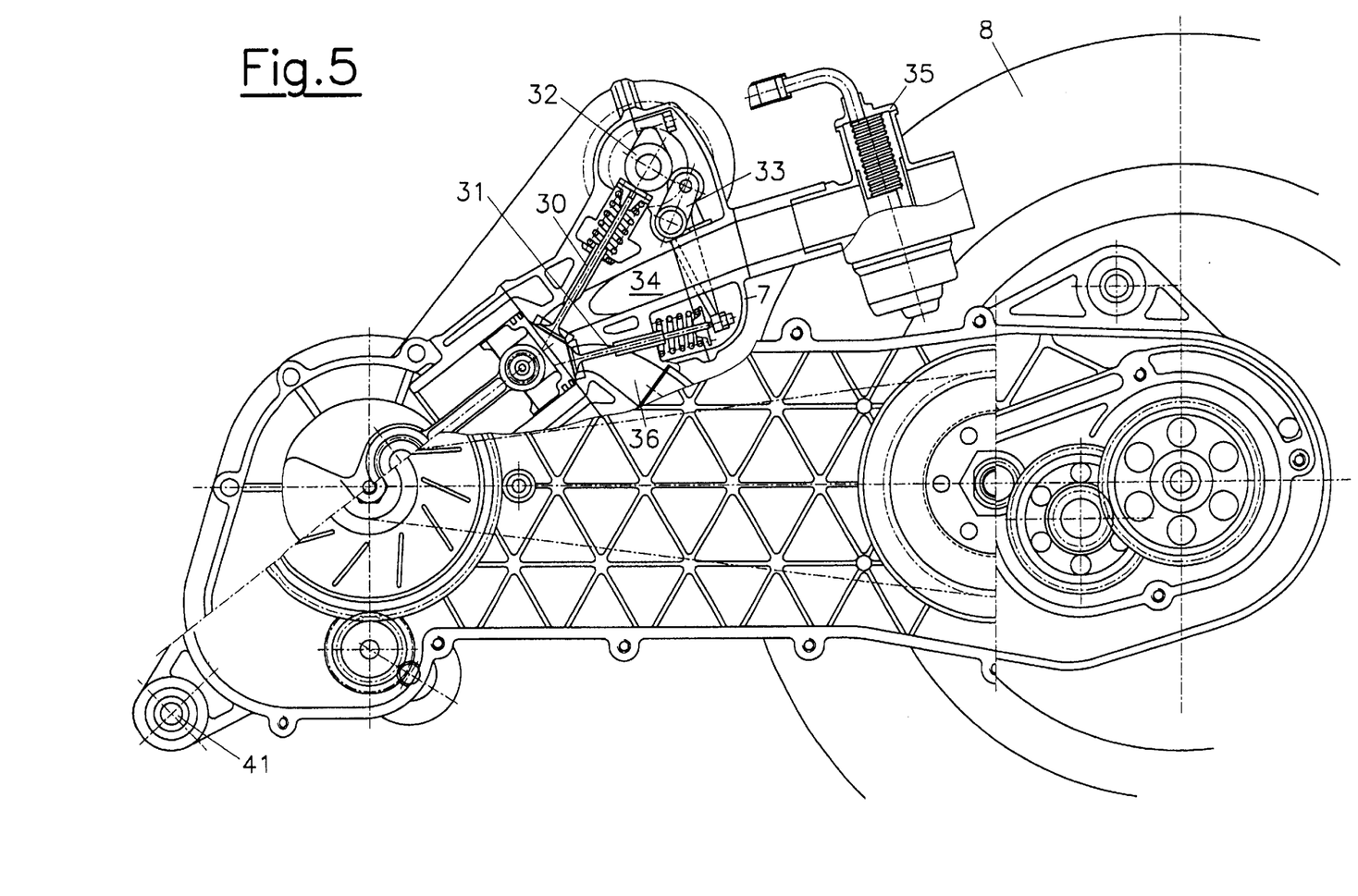
FIG. 5 shows a partial sectional view of a further embodiment of the invention.

The embodiment of FIG. 5 shows a detail of a solution with a single-cylinder internal combustion engine. As in FIG. 2, the intake valves 30 are directly actuated by an overhead camshaft 32. The exhaust valves 31 are actuated by way of rocker levers 33 which are in operative connection with the camshaft 32.

This allows providing the cylinder head 7 in the zone of the rear wheel 8 with a low arrangement, so that a short overall length is achieved. Furthermore, the intake port 34 is guided in the embodiment according to FIG. 5 between the valves 30, 31, so that a reverse-tumble concept is achieved. The valves 30, 31 are inclined in a V-shaped manner at an angle of approx. 45° towards one another in order to free up the required space. This allows a particularly simple guidance of the intake air and allows the possibility to provide the carburettor 35 in a laterally swivelled manner next to the rear wheel 8. The exhaust port 36 is guided downwardly and can thus also be housed in a very compact manner.

The present invention allows providing a drive concept for a motorcycle which is arranged in the manner of a scooter with a low overall size and a compact design even when a larger piston capacity of e.g. 500 cm$^3$ to 900 cm$^3$ is provided.

Figure 6:
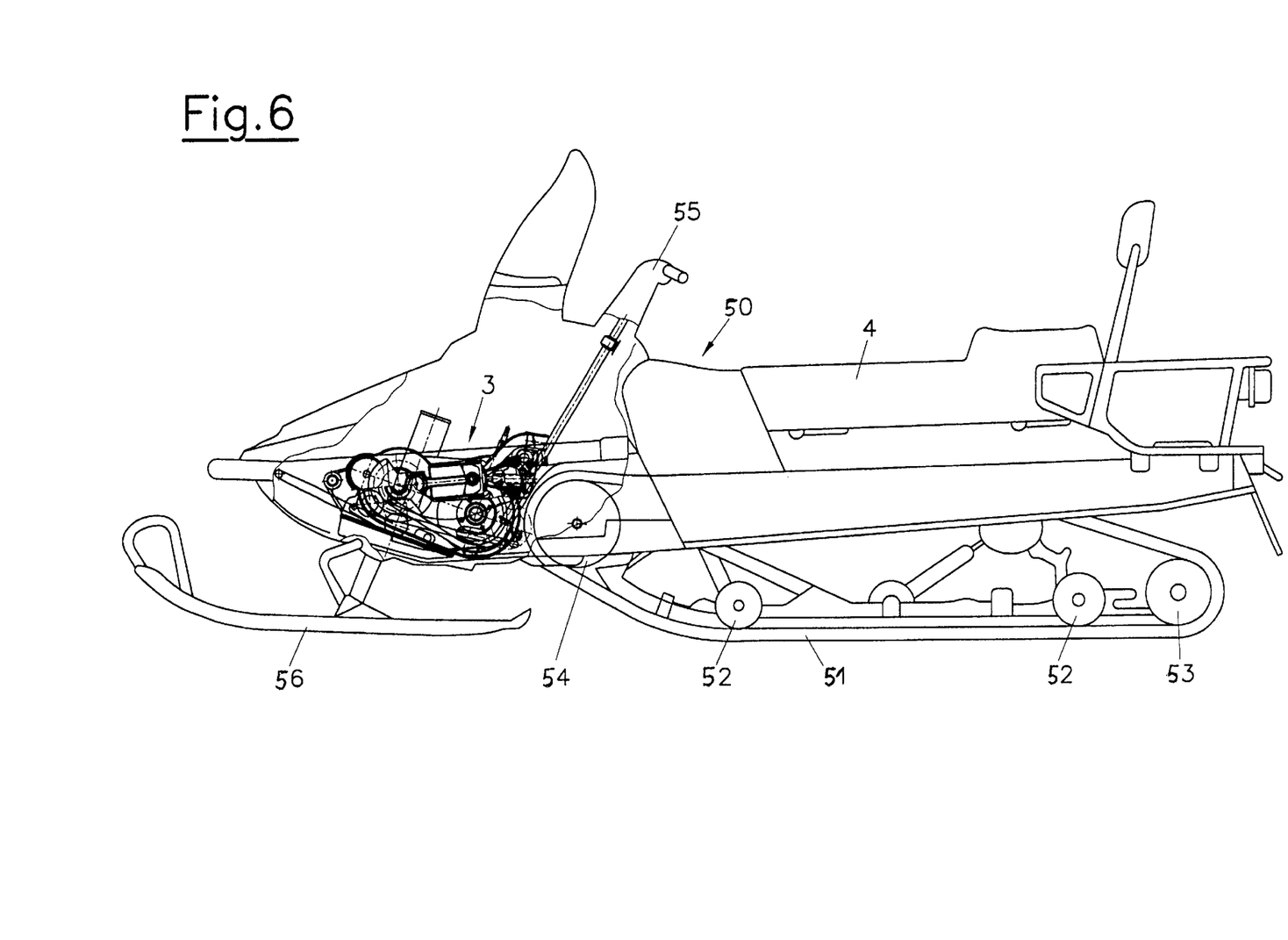
FIG. 6 shows a snowmobile according to the invention.

The snowmobile of FIG. 6 comprises a body 50 on which a seat 4 for the driver and, optionally, a passenger is provided. A drive track 51 is guided by track rollers, deflection rollers 53 and a drive roller 54. Steering is performed in the conventional manner via a handlebar 55 which acts upon a swivellable ski 56.

Figure 7:
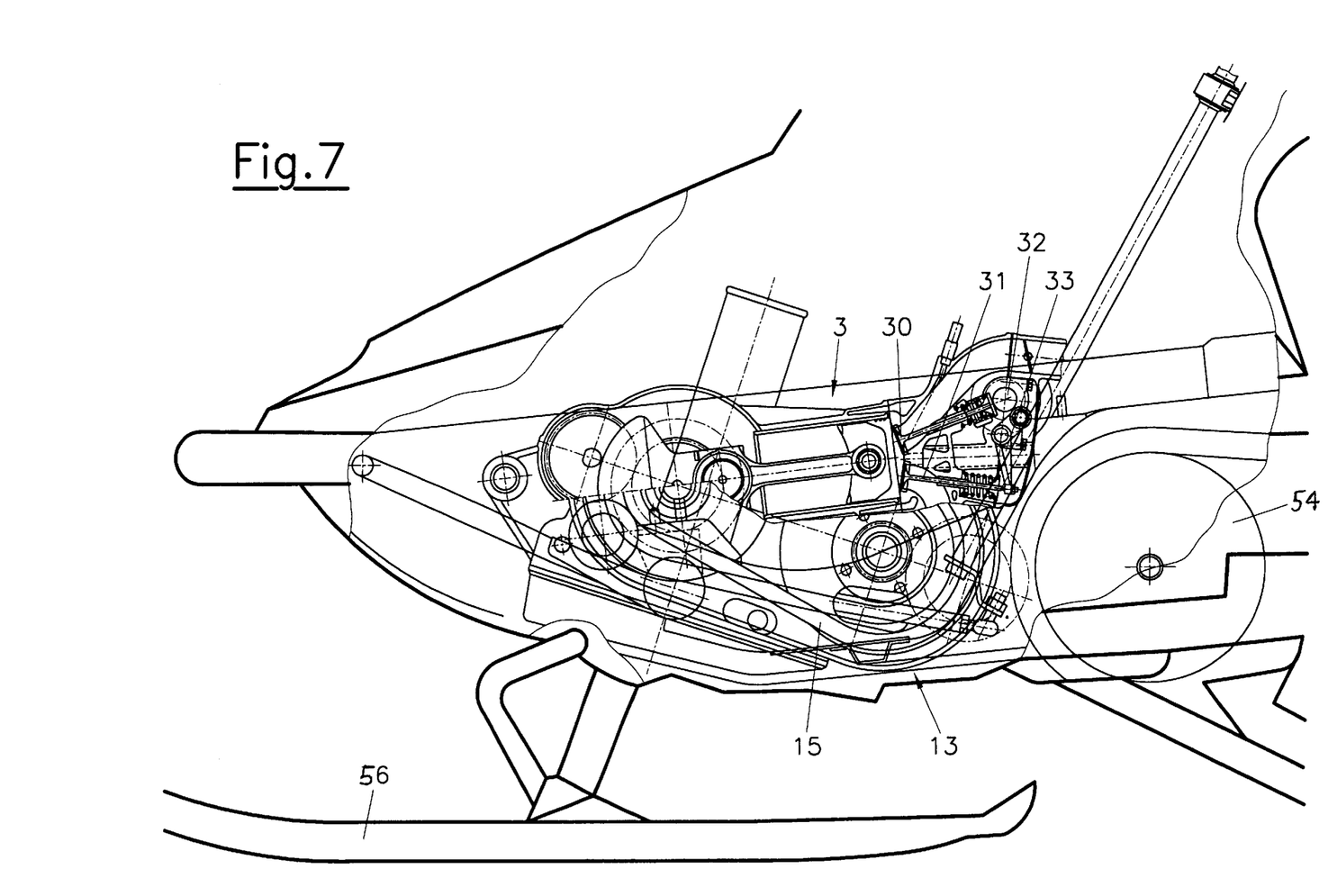
FIG. 7 a detail of FIG. 6.

The arrangement of the drive unit of the embodiment according to FIGS. 6 and 7 is similar to the embodiment of FIG. 3. The cylinder 5 of the internal combustion engine 3 is arranged rearwardly in a virtually horizontally manner. Power transmission is performed by an infinitely-variable change-speed gear 13 with a pulling strap 15. In order to take the requirements of a snowmobile into account, a gear reducer unit (not shown) is interposed between the gear 13 and the drive roller 54 in order to enable the engagement of a reserve gear. As a result of the analogous arrangement in respect to FIGS. 2 and 3, with the valve control of the intake valves 30 via the camshaft 32 directly and the exhaust valves 31 via the rocker levers 33, the internal combustion engine 3 can be moved in a highly compact manner towards the drive roller 54.

What is claimed is:

1. A single-track motor vehicle with an internal combustion engine with at least one cylinder which extends rearwardly of said vehicle at an upward inclination, with at least one intake valve being located above at least one exhaust valve, wherein the exhaust valve is triggered by way of a rocker lever, and the intake valve is directly triggered by an overhead camshaft.

2. A single-track motor vehicle as claimed in claim 1, wherein the valves are inclined in a V-shaped manner toward one another and an intake port is guided between the valves to the cylinder.

3. A single-track motor as claimed in claim 1, including an infinitely-variable change-speed gear having a first gear shaft which is connected with a crankshaft and a second gear shaft which is held in a cylinder block of the internal combustion engine.

4. A single-track motor vehicle as claims in claim 3, wherein a centrifugal clutch is held on the second gear shaft.

5. A single-track motor vehicle as claimed in claim 3, wherein the infinitely-variable change-speed gear is a dry-running pulling strap drive.

6. A single-track motor vehicle as claimed in claim 3, wherein the infinitely-variable change-speed gear is a trust link chain.

7. A single-track motor vehicle as claimed in claim 1, including at least one mass balancer shaft integrated in a housing of the internal combustion engine.

8. A single-track motor vehicle as claimed in claim 1, wherein the internal combustion engine is a two cylinder engine with four valves per cylinder.

9. A single-track motor vehicle as claimed in claim 1, including a crankshaft axis, an axis of a balancer shaft and an axis of the gear shaft located in a common plane of division of the internal combustion engine.

10. A single-track motor vehicle as claimed in claim 1, which is a snowmobile, and wherein the internal combustion engine is disposed directly in front of a drive track.

11. A single-track motor vehicle as claimed in claim 1, which is a motorcycle, and wherein the internal combustion engine is disposed directly in front of a rear wheel.

12. A single-track motor vehicle as claimed in claim 11, wherein the internal combustion engine is a part of a rear suspension swing arm.

\* \* \* \* \*